(12) United States Patent
Wang et al.

(10) Patent No.: US 7,559,242 B2
(45) Date of Patent: Jul. 14, 2009

(54) SILICON MICROMACHINED ULTRA-SENSITIVE VIBRATION SPECTRUM SENSOR ARRAY (VSSA)

(75) Inventors: Li-Peng Wang, San Jose, CA (US); Qing Ma, San Jose, CA (US); Valluri Rao, Saratoga, CA (US); Goutam Paul, Saratoga, CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 11/097,059

(22) Filed: Mar. 31, 2005

(65) Prior Publication Data

US 2006/0219016 A1    Oct. 5, 2006

(51) Int. Cl.
*G01D 21/00* (2006.01)
(52) U.S. Cl. .......................................... 73/651; 73/649
(58) Field of Classification Search ........... 73/649–651; 340/669
See application file for complete search history.

(56) References Cited

U.S. PATENT DOCUMENTS

| | | | |
|---|---|---|---|
| 3,745,384 A | 7/1973 | Blanchard | |
| 4,344,328 A | 8/1982 | Hawkins | |
| 5,001,933 A | 3/1991 | Brand | |
| 5,089,695 A | 2/1992 | Willson et al. | |
| 5,610,337 A | 3/1997 | Nelson | |
| 5,856,722 A | 1/1999 | Haronian et al. | |
| 6,079,274 A * | 6/2000 | Ando et al. | 73/649 |
| 6,223,601 B1 * | 5/2001 | Harada et al. | 73/649 |
| 6,327,909 B1 * | 12/2001 | Hung et al. | 73/514.16 |
| 6,374,677 B1 | 4/2002 | Berlin et al. | |
| 6,402,968 B1 * | 6/2002 | Yazdi et al. | 216/2 |
| 6,408,496 B1 | 6/2002 | Maynard | |
| 6,438,243 B1 | 8/2002 | Ikeuchi et al. | |
| 6,484,109 B1 * | 11/2002 | Lofall | 702/56 |
| 6,622,647 B2 | 9/2003 | DePoy | |
| 7,092,539 B2 * | 8/2006 | Sheplak et al. | 381/114 |
| 2003/0005872 A1 * | 1/2003 | DePoy, II | 114/21.3 |

(Continued)

FOREIGN PATENT DOCUMENTS

EP      0 959 333 A2      11/1999

OTHER PUBLICATIONS

PCT/US2006/012602, Aug. 31, 2006, International Search Report.

(Continued)

*Primary Examiner*—Daniel S Larkin
*Assistant Examiner*—Nashmiya S Fayyaz
(74) *Attorney, Agent, or Firm*—Blakely, Sokoloff, Taylor & Zafman LLP

(57) ABSTRACT

An apparatus comprising a substrate and an array of vibration sensors formed on the substrate, the array comprising two or more vibration sensors, wherein each vibration sensor in the array has a different noise floor and a different operational frequency range than any of the other vibration sensors in the array. A process comprising forming an array of vibration sensors on a substrate, the array comprising two or more vibration sensors, wherein each of the two or more vibration sensors in the array has a different noise floor and a different operational frequency range than any of the other vibration sensors in the array. Other embodiments are disclosed and claimed.

25 Claims, 6 Drawing Sheets

U.S. PATENT DOCUMENTS

2006/0219016 A1 10/2006 Wang et al.
2007/0245827 A1 10/2007 Wang

OTHER PUBLICATIONS

Kunz, K. et al., "Highly Sensitive Triaxial Silicon Accelerometer with Integrated PZT Thin Film Detectors," Elsevier Science B.V., (2001), pp. 156-160.

Zou, Q. et al., "Highly Symmetric Tri-axis Piezoelectric Bimorph Accelerometer," IEEE, (2004), pp. 197-200.

Wilcoxon 793L datasheet (bulk ceramic accelerometers), Wilcoxon Research, Inc., 1999.

ADXL 105 datasheet (MEMS capacitive accelerometers), Analog Devices Inc., 1999.

J. Bernstein, et al., "Low- Noise MEMS Vibration Sensor for Geophysical Applications," Journal of Microelectromechanical Systems, vol. 8, No. 4, pp. 433-438, Dec. 1999.

J. Chae et al., "An In-Plane High-Sensitivity, Low-Noise Micro-g Silicon Accelerometer With CMOS Readout Circuitry," Journal of Microelectromechanical Systems, vol. 13, No. 4, pp. 628-635, Aug. 2004.

PCT/US2006/012602, International Preliminary Report on Patentability and Written Opinion, dated Oct. 3, 2007.

Office Action mail date Jun. 25, 2008, U.S. Appl. No. 11/407,640, filed Apr. 20, 2006. (Publication No. US 2007/0245827A1).

S. Timoshenko, "Vibration Problems In Engineering", Second Edition—Fifth Printing; D. Van Nostrand Company, Inc.; pp. iii-ix, and pp. 1-470.

* cited by examiner

SILICON MICROMACHINED ULTRA-SENSITIVE VIBRATION SPECTRUM SENSOR ARRAY (VSSA)

TECHNICAL FIELD

The present invention relates generally to vibration sensors and in particular, but not exclusively, to arrayed microelectromechanical (MEMS) vibration sensors.

BACKGROUND

Vibration sensors are commonly used for monitoring the vibrations of structures such as buildings and bridges; vehicles such as ships, airplanes, autos and trains; and tools and machinery in factories. Many applications—particularly high-precision tools and machinery—require real-time monitoring to detect any abnormal vibration, because excess vibration in a tool's or machine's environment can cause the tool or machine to malfunction, and certain vibrations originating from the tools or machines themselves serve as indications that maintenance is needed. Therefore, accurate in-line monitoring could significantly reduce the down time and associated cost.

Mechanical vibrations in a structure, vehicle, tool or machine can occur over a wide range of intensities and frequencies, depending on the details of construction and operation. Available state-of-the-art vibration sensors, however, have features that make them unsuitable for use over a wide range of applications. On one hand, highly sensitive vibration sensors with low noise floors (i.e., the minimum vibration intensity the sensor can detect) are large in size, making them difficult to use for applications requiring a small form factor and light weight, such as monitoring robotic arms. They are also prohibitively expensive for applications that require a large number of sensors, such as increasingly important large-scale sensor network applications. On the other hand, very small, lightweight sensors such as microelectromechanical (MEMS) based sensors are not sensitive enough at low frequency ranges.

BRIEF DESCRIPTION OF THE DRAWINGS

Non-limiting and non-exhaustive embodiments of the present invention are described with reference to the following drawings, wherein like reference numerals refer to like parts throughout the various views unless otherwise specified. Elements shown in the drawings are not drawn to scale unless otherwise indicated.

DETAILED DESCRIPTION OF THE ILLUSTRATED EMBODIMENTS

Embodiments of an apparatus and method for sensing vibrations are described herein. In the following description, numerous specific details are described to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail but are nonetheless encompassed within the scope of the invention.

Reference throughout this specification to "one embodiment" or "an embodiment" means that a particular feature, structure, or characteristic described in connection with the embodiment is included in at least one embodiment of the present invention. Thus, appearances of the phrases "in one embodiment" or "in an embodiment" in this specification do not necessarily all refer to the same embodiment. Furthermore, the particular features, structures, or characteristics may be combined in any suitable manner in one or more embodiments.

Figure 1:
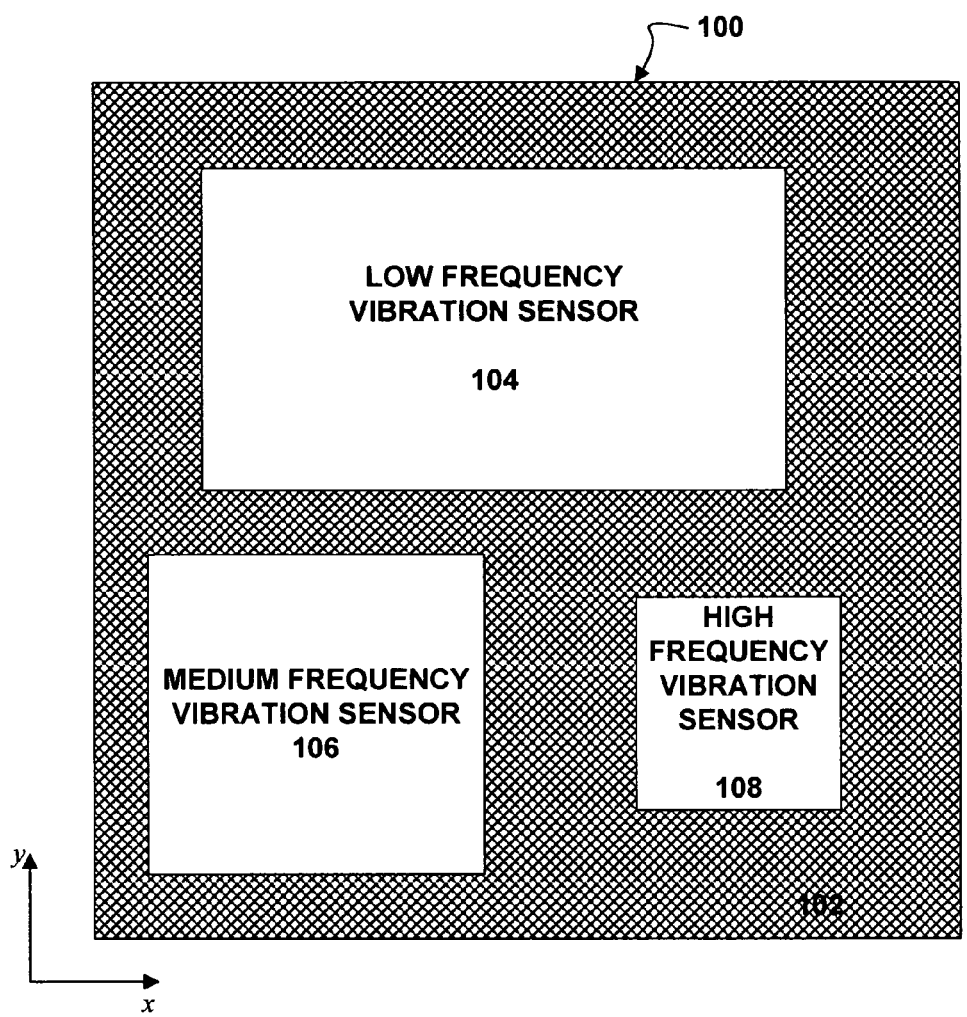
FIG. 1 is a plan view of an embodiment of a sensor array including a plurality of microelectromechanical (MEMS) vibration sensors.

FIG. 1 illustrates an embodiment of the invention comprising a vibration sensor array 100. The vibration sensor array 100 includes a substrate 102 on which three microelectromechanical (MEMS) vibration sensors are formed: a low-frequency vibration sensor 104, a medium frequency vibration sensor 106, and a high-frequency vibration sensor 108. The substrate 102 provides a base upon which the vibration sensors 104, 106 and 108 can be built, and can be any substrate in which MEMS devices can be built. In one embodiment the substrate 102 is made of silicon, although in other embodiments the substrate can be made of other materials such as silicon compounds, combinations of silicon and other materials, or other materials altogether. Moreover, although the substrate 102 is shown in the figure as a monolithic substrate made up of a single material, in other embodiments the substrate can be a composite substrate made up of layers of different materials such as dielectrics, conductors and semiconductors.

The vibration sensors 104, 106 and 108 can be formed in at least two ways: in one embodiment the sensors can be formed on one or more surfaces of the substrate 102 using surface micromachining processes, while in another embodiment the sensors can be formed in the substrate using bulk micromachining processes. Throughout this patent application, reference to one or more components being formed "on" a substrate is intended to include components formed using one or the other, or both, of surface micromachining and bulk micromachining. Although the sensor array 100 has all its vibration sensors 104, 106 and 108 on the same side of the substrate, in other embodiments one or more of the sensors 104, 106 and 108 could also be formed on different sides of the substrate 102. Moreover, although three vibration sensors are shown, in other embodiments a lesser or greater number of vibration sensors could be formed on the substrate 102.

Each of the vibration sensors 104, 106 and 108 has a noise floor different from the others, as well as an operational frequency range different from the others. In one embodiment, the vibration sensor with the lowest noise floor also has the lowest operational frequency range, while the vibration sensor with the highest noise floor has the highest operational frequency range. Also, in one embodiment the vibration sensors 104, 106, 108 have different noise floors but overlapping operational frequency ranges. With this combination of sensors having different noise floors and different operational frequency ranges, the vibration sensor array 100 can be used to accurately detect vibrations over a wide spectrum of frequencies and intensities.

In one embodiment of the array 100, each individual vibration sensor 104, 106 and 108 can be a one-axis, two-axis or three-axis vibration sensor; in other words, the individual vibration sensors can be capable of sensing vibrations in one, two or three directions. In any given array 100, the individual vibration sensors 104, 106 and 108 need not have the same construction or the same number of axes; instead, the array can consist of combinations of one-axis, two-axis or three-axis vibration sensors. The array can also consist of combinations of subsets of these—in other words, the array can include only one-and two-axis vibration sensors, only one- and three-axis sensors, or only two- and three-axis sensors.

In some applications, two- or three-axis vibration sensing is required, but two- or three-axis vibration sensors are not sufficiently sensitive in all directions. A three-axis vibration sensor, for example, may be very sensitive in one direction but much less sensitive in the other two directions. In cases where high sensitivity is required in all directions, the vibration sensors 104, 106 and 108 can, in one embodiment, all be one-axis vibration sensors with their axis aligned in different directions, for example one with its axis in the x direction, one with its axis in the y direction and one with its axis in the z direction. In another embodiment, the vibration sensors 104, 106 and 108 can also comprise multi-axis vibration sensors with their axes of greatest sensitivity aligned in different directions.

In operation, the vibration sensor array 100 is attached to a device whose vibration is to be measured. The vibration sensors 104, 106 and 108 in the array have a range of noise floors, a wide operational frequency range and, in some embodiments, the ability to sense vibration in more than one direction. With this combination of features, at least one of the sensors will be able to accurately sense the particular intensity and frequency of vibration of the device to which the sensor array 100 is attached. The outputs of the one or more vibration sensors 104, 106 and 108 that measure the vibration of the device are then routed to the proper equipment for conditioning and processing.

Figure 2:
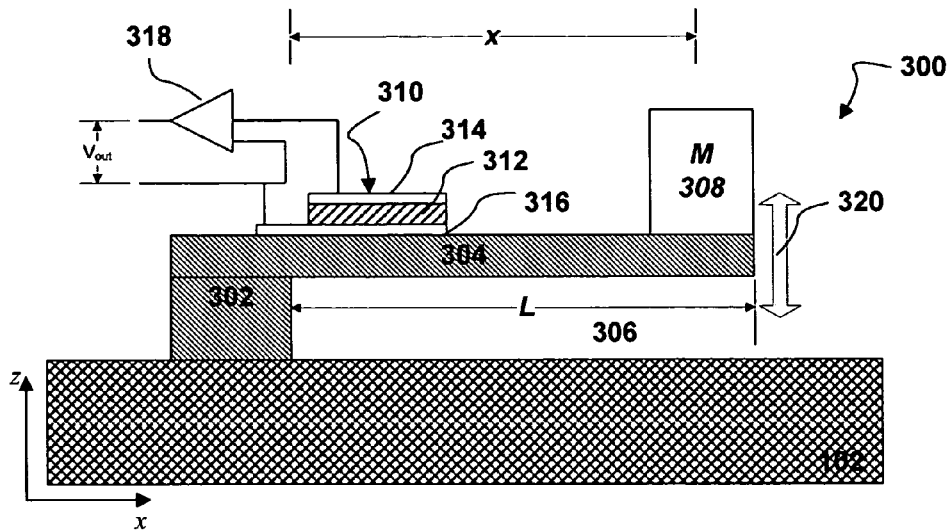
FIG. 2 is a side elevation of an embodiment of a MEMS vibration sensor usable with the embodiment of the array shown in FIG. 1.

FIG. 2 illustrates an embodiment of a MEMS vibration sensor 300 that can be used as one or more of the vibration sensors 104, 106 or 108 in the vibration sensor array 100. The vibration sensor 300, like the other embodiments of vibration sensors discussed herein, can be manufactured using techniques known in the art, such as silicon micromachining and depositing, patterning and etching of materials.

In the vibration sensor 300, the vibrating element is a cantilever beam 304 attached to the substrate 102 by an anchor 302. The anchor 302 serves both to attach the cantilever beam 304 to the substrate and to suspend the cantilever beam 304 above the substrate such that there is an air gap 306 between the cantilever beam 304 and the substrate. This air gap 306 permits the cantilever beam to vibrate in the direction indicated by the arrows 320. In one embodiment, the anchor 302 and the cantilever beam 304 are a single unit made of the same material, such as polysilicon, silicon nitride (SiN), single crystal silicon, and the like. In other embodiments, however, the anchor 302 and cantilever beam 304 can be separate units made of the same material or separate units made of different materials, and the materials can be materials besides those listed.

A mass 308 of magnitude M is formed on the cantilever beam 304 at a distance x from the anchor 302. In other embodiments, however, the mass 308 can be omitted completely. In one embodiment including the mass 308, the mass is made of a dense material such as gold (Au), silver (Ag) or platinum (Pt), but in other embodiments the mass 308 can be made of another material not listed here. The magnitude M of the mass 308, along with its position x along the beam and the length L and cross section of the cantilever beam 304 can be varied to tailor the noise floor and operational frequency range of the vibration sensor 300. The fundamental lower limit for noise floor corresponds to Brownian motion and is given by:

$$a_n = \sqrt{\frac{4k_B T \omega_0}{MQ}},$$

where $a_n$ is the theoretical noise floor (also known as the equivalent noise acceleration), $k_B$ is Boltzmann's constant, T is the temperature, $\omega_0$ is the resonance frequency, M is the mass and Q is an empirical mechanical quality factor. As can be seen, the noise floor of the vibration sensor 300 can be lowered by increasing the magnitude M of the mass 308. This lowering of the noise floor, however, is countered by another phenomenon: as the value of M increases, the value of the resonance frequency $\omega_0$ decreases. Since the resonance frequency $\omega_0$ is the upper limit of the operational frequency range of the vibration sensor 300, this means that increasing the mass M lowers the noise floor but decreases the operational frequency range of the sensor. Thus, the design of the vibration sensor 300, including the selection of the magnitude M of the mass 308, will depend on a trade-off between noise floor and frequency range.

A transducer 310 is formed on the cantilever beam 304 to translate the vibrations of the cantilever beam 304 into output signals that can be processed and analyzed. The transducer 310 will generally be formed at a position on the cantilever beam where it can sense the beam's vibrations with sufficient sensitivity, but where its mass does not significantly affect the cantilever beam's vibration. In the embodiment shown, the transducer 310 is piezoelectric and comprises a piezoelectric material 312 such as aluminum nitride (AlN) sandwiched between a lower conductive layer 316 and an upper conductive layer 314. The lower conductive layer 316 is in contact with the cantilever beam 304. The upper conductive layer 314 and lower conductive layer 316 are coupled to the inputs of an amplifier 318, which outputs a voltage $V_{out}$ as a result of charges created in the upper and lower conductive layers due to deformation of the piezoelectric material 312. In one embodiment, the amplifier 318 is a low-noise charge amplifier, but in other embodiments other types of amplifiers can be used. In other embodiments, the transducer 310 may be of another type, such as piezoresistive or capacitive.

The vibration sensor 300 is primarily a one-axis sensor, since it tends to vibrate primarily as shown by the arrow 320 and is thus most sensitive to vibrations along the z axis referenced in the figure. The vibration sensor 300, however, is capable of sensing vibrations along the y axis (into and out of the page), and thus could be used as a two-axis vibration sensor, although with less sensitivity along they axis than along the z axis.

Figure 3:
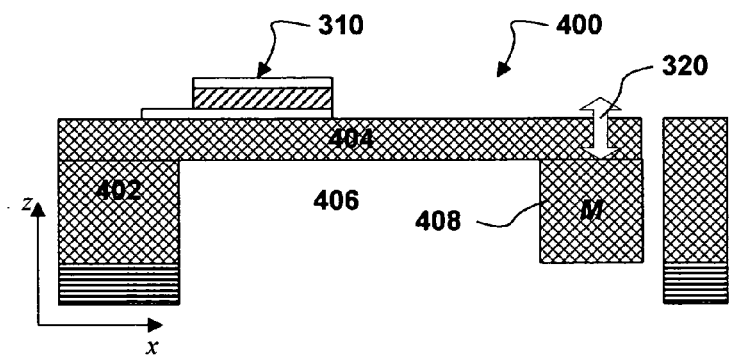
FIG. 3 is a side elevation of an alternative embodiment of the MEMS vibration sensor shown in FIG. 2.

FIG. 3 illustrates a MEMS vibration sensor 400 that is an alternative embodiment of the vibration sensor shown in FIG. 2. Like the vibration sensor 300, in the vibration sensor 400 the vibrating element is a cantilever beam 404 connected to an anchor 402, with a resulting air gap 406 under the cantilever beam 404. The vibration sensor 400 also includes a transducer 310 and a mass 308 formed on the cantilever beam 304. The primary differences between the vibration sensor 400 and the vibration sensor 300 are the method of manufacture and the placement of the mass 308. The vibration sensor 400 is built using bulk micromachining, so that the anchor 402, the cantilever beam 404 and the mass 408 are all formed from the substrate material. For example, in one embodiment where the substrate is a silicon-on-insulator (SOI) substrate including a layer of single crystal silicon on an insulating layer, the anchor 402, the cantilever beam 404 and the mass 408 can all be made of single crystal silicon. Because the vibration sensor 400 is built using bulk micromachining, the mass 408 can be formed on the bottom of the cantilever beam 404.

Figure 4:
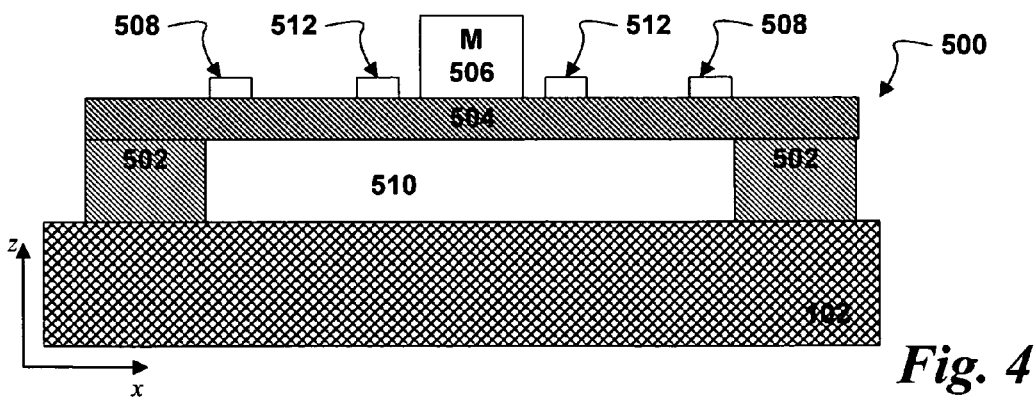
FIG. 4 is a side elevation of an alternative embodiment of the MEMS vibration sensor usable with the embodiment of the array shown in FIG. 1.

FIG. 4 illustrates another embodiment of a MEMS vibration sensor 500 that can be used with the vibration sensor array 100. The vibration sensor 500 differs from the vibration sensors 300 and 400 mostly in the type of vibrating element it uses. In the vibration sensor 500, the vibrating element is a bridge beam 504 supported by a pair of anchors 502. As with the vibration sensor 300, the vibration sensor 500 is surface micromachined such that the anchors 502 attach the beam 504 to the substrate 102 and suspend the beam 504 over the substrate 102. This creates an air gap 510 between the beam 504 and the substrate 102 that permits the bridge beam 504 to vibrate in the direction indicated by the arrows. As with the cantilever beam 304, in one embodiment the anchors 502 and the bridge beam 504 are made of the same material, such as polysilicon, silicon nitride (SiN), single crystal silicon, and the like. In other embodiments, however, the anchors 502 and bridge beam 504 need not be made of the same materials and can be made using materials besides those listed.

A mass 506 of magnitude M is formed on the bridge beam 504. The magnitude M of the mass 506 is determined taking into account the same factors mentioned above for the vibration sensor 300. In the embodiment shown, the mass 506 is positioned substantially at the mid-span of the beam 504, but in other embodiments the mass 506 could be moved closer to one of the anchors 502. In yet another embodiment, the mass 506 could also be placed on the lower side of the bridge beam 504, similarly to the placement of the mass 308 on the cantilever beam 304 in the vibration sensor 400.

Two pairs of transducers 508 and 512 are positioned on the beam 504, with one pair either side of the mass 506. The transducers 508 are formed on the beam 504 near the anchors 502 where the upper surface of the beam will be in tension when a force is applied to the beam in the −z direction. The transducers 512 are formed on the beam 504 closer to midspan, where the upper surface of the beam will experience compression when a force is applied to the beam in the −z direction. In one embodiment, each of the transducers 508 and 512 can be a piezoelectric transducer, such as the transducer 310 discussed above for the vibration sensor 300. In other embodiments, the transducers 508 and 512 can be of another type, such as piezoresistive or capacitive, and both transducers 508 and 512 need not be of the same type. In still other embodiments, a greater or lesser number of transducers 508 can be used and transducers can be placed at different or additional locations on the beam 504.

Figure 5:
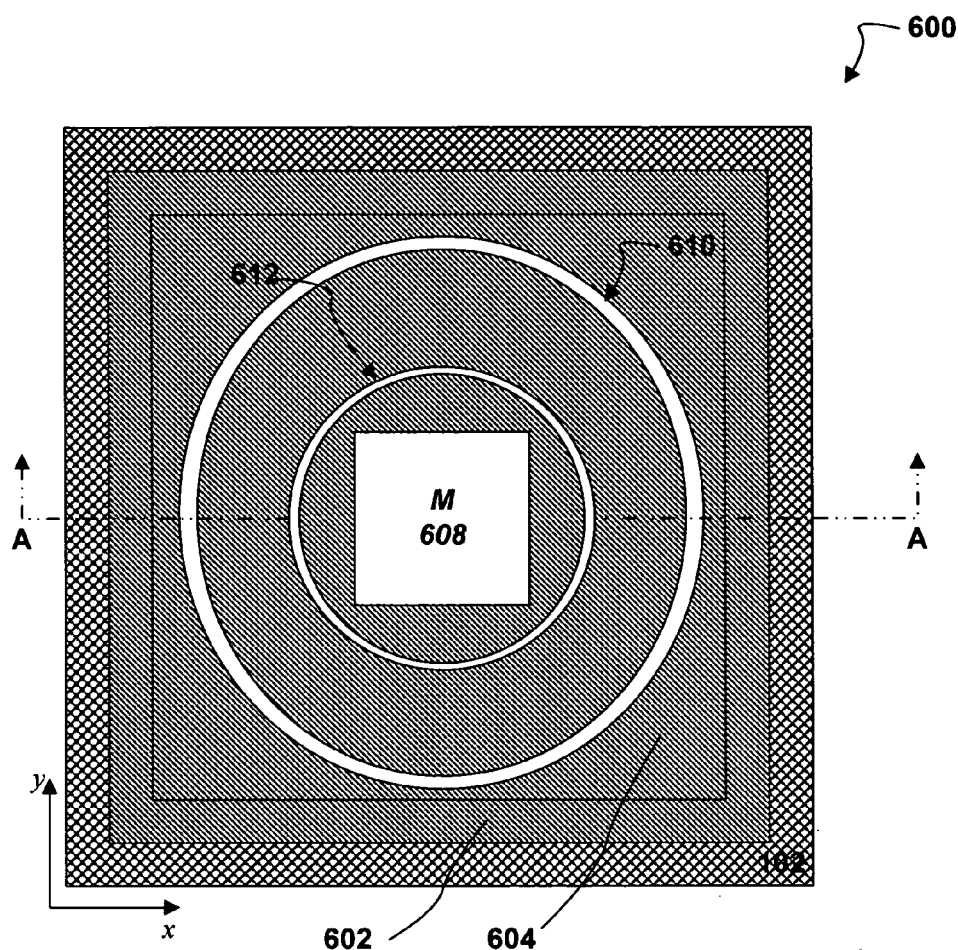
FIG. 5 is a plan view of yet another alternative embodiment of the MEMS vibration sensor usable with the embodiment of the array shown in FIG. 1.
Figure 6:
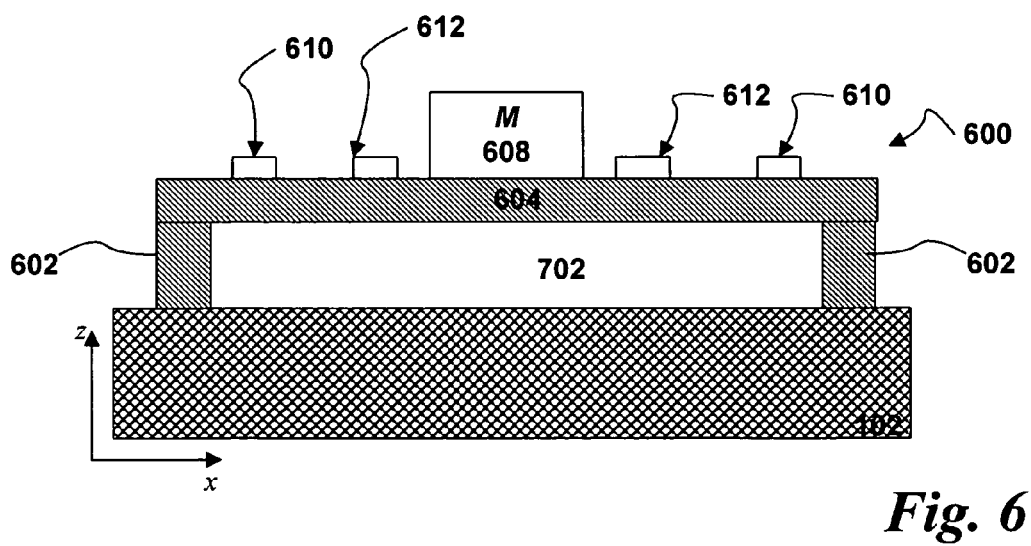
FIG. 6 is a side elevation of the MEMS vibration sensor shown in FIG. 5, taken substantially along section line A-A.

FIGS. 5 and 6 together illustrate yet another embodiment of a MEMS vibration sensor 600 that can be used with the vibration sensor array 100. The vibration sensor 600 is a membrane-type sensor in which the vibrating element is a membrane 604 supported around its perimeter by an anchor 602. As with vibration sensor 300, vibration sensor 600 is surface micromachined, such that the anchor 602 attaches the membrane 604 to the substrate 102 and suspends the membrane 604 over the substrate 102, creating an air gap 702 between the membrane 604 and the substrate 102 that permits the membrane 604 to vibrate. In one embodiment, the anchor 602 and the membrane 604 are a single unit made of the same material, such as polysilicon, silicon nitride (SiN), single crystal silicon, and the like. In other embodiments, however, the anchor 602 and membrane 604 can be separate units made of the same material or separate units made of different materials, and the materials can be materials besides those listed.

A mass 608 of magnitude M is formed on the membrane 604, and the magnitude M of the mass 506 is determined taking into account the same factors mentioned above for the vibration sensor 300. In the embodiment shown, the mass 506 is positioned substantially at the center of the membrane 604, but in other embodiments the mass 608 could be moved to a different location on the membrane 604. In yet another embodiment, the mass 506 could also be placed on the lower side of the membrane 604, similarly to the placement of the mass 308 on the cantilever beam 304 in the vibration sensor 400.

A pair of transducer rings 610 and 612 are positioned on the membrane 604 surrounding the mass 608. The transducer ring 610 is formed on the membrane 604 near the anchor 602 where the upper surface of the membrane will be in tension when a force is applied to the membrane in the −z direction. The transducer ring 612 is formed on the membrane 604 closer to the mass 608, where the upper surface of the membrane will experience compression when a force is applied to the membrane in the −z direction. In one embodiment, the transducers 610 and 612 can be piezoelectric transducers 310 as shown above for the vibration sensor 300, but in other embodiments, the transducers 610 and 612 may be of another type, such as piezoresistive or capacitive, and need not be of the same type. Additionally, the embodiment shown uses transducers 610 and 612 on the top of the membrane 604, but in other embodiments the transducers 610 and 612 could be placed on the bottom of the membrane, or could be replaced with one or more transducers at various locations on the membrane.

Figure 7:
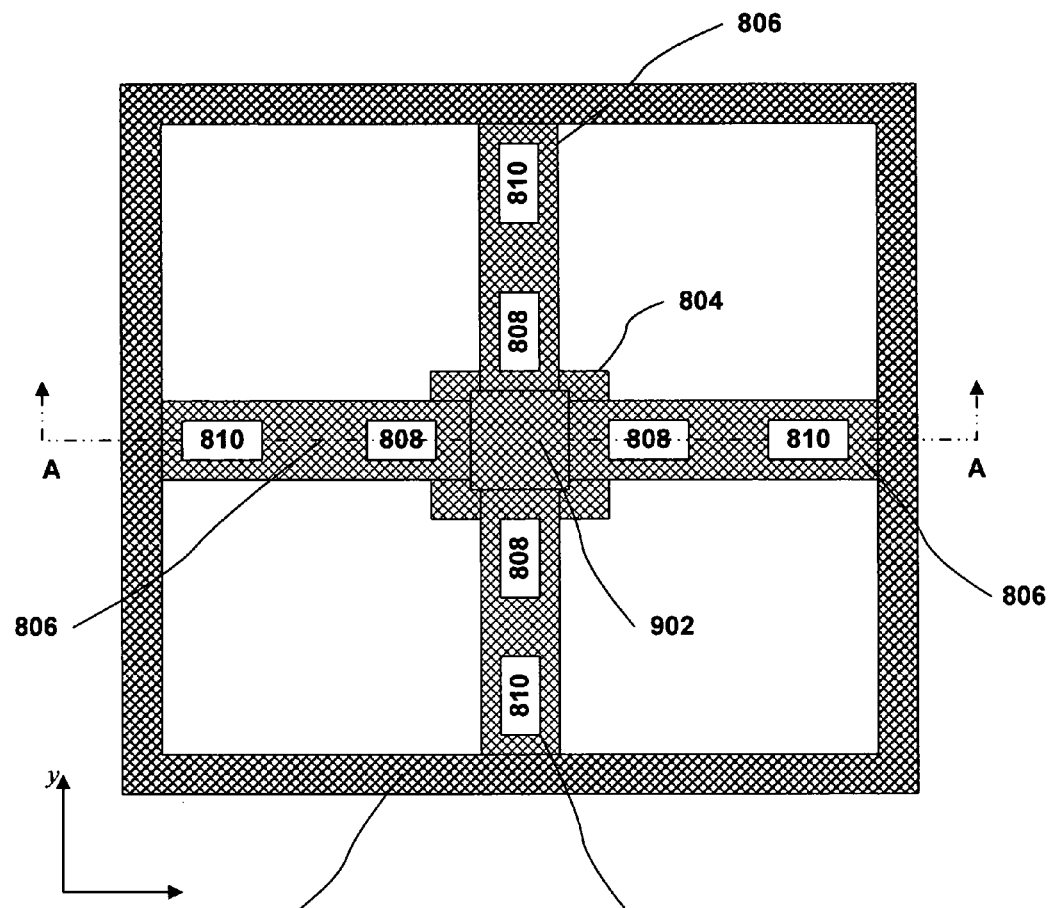
FIG. 7 is a plan view of still another alternative embodiment of the MEMS vibration sensor usable with the embodiment of the array shown in FIG. 1.
Figure 8:
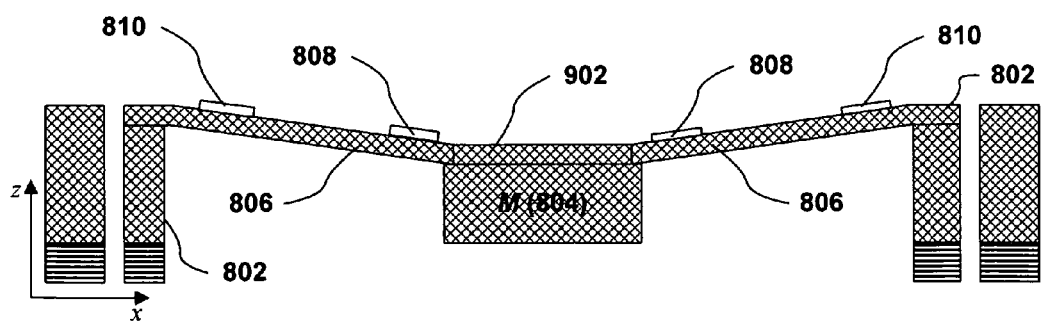
FIG. 8 is a side elevation of the MEMS vibration sensor shown in FIG. 7, taken substantially along section line A-A.

FIGS. 7 and 8 together illustrate yet another embodiment of a MEMS vibration sensor 800 that can be used with the vibration sensor array 100. The MEMS vibration sensor 800 is a three-axis vibration sensor that includes a substantially rectangular anchor 802 from which a vibrating element is suspended. The vibrating element comprises four suspension elements 806, one attached to each side of the anchor 802, and a center coupling 902 to which the suspension elements 806 are attached. A mass 804 of magnitude M is suspended from the center coupling 902. Like the vibration sensor 400, the vibration sensor 800 is made by bulk micromachining, such that the four suspension elements 806, the center coupling 902 and the mass 804 are all made of the same material of which the substrate is made. For example, in one embodiment where the substrate is a silicon-on-insulator (SOI) substrate including a layer of single crystal silicon on an insulating layer, the four suspension elements 806, the center coupling 902 and the mass 804 can all be made of single crystal silicon.

Pairs of transducers 808 and 810 are formed on each suspension member 806. The transducers 810 are formed on the suspension members 806 near the anchor 802, where the upper surfaces of the suspension members will be in tension when a force is applied to the center coupling 902 in the −z direction. The transducers 808 are formed on the suspension members 806 closer to the center coupling 902, where the upper surfaces of the suspension members 806 will experience compression when a force is applied to the center coupling 902 in the −z direction. As with the other vibration sensors discussed above, more or less transducers could be used and could be positioned differently than shown. The particular construction of the vibration sensor 800 and placement of transducers 808 on each suspension element 806 allow the vibration sensor 800 to detect vibrations along all three of the x, y and z axes, although the z axis is likely to be its axis of greatest sensitivity.

Figure 9:
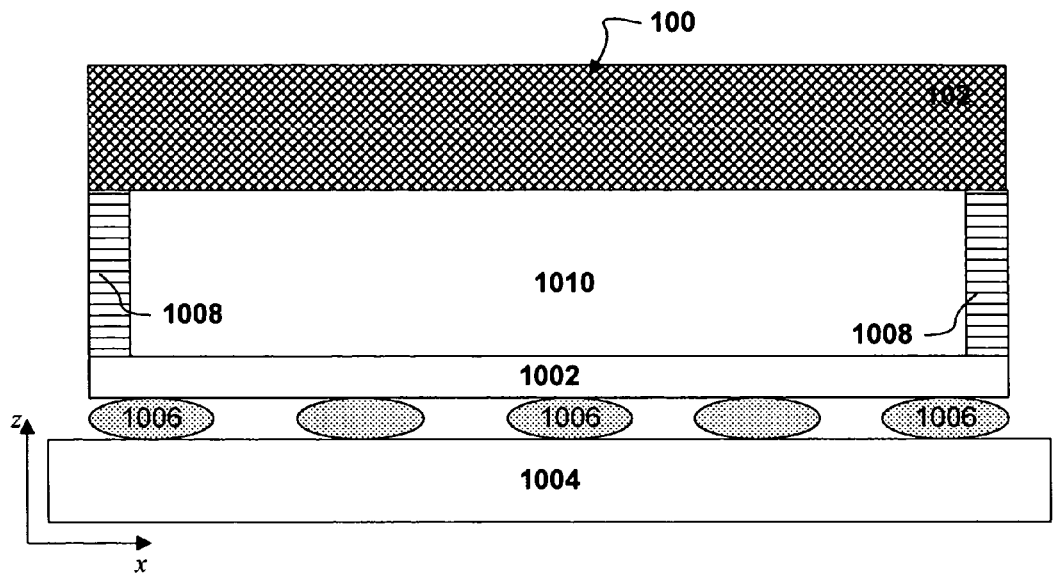
FIG. 9 is a side elevation of an embodiment of an application including the vibration sensor array shown in FIG. 1.

FIG. 9 illustrates an embodiment of an electronic package 1000 including a sensor array 100. In the package 1000, the vibration sensor array 100 is flipped upside down and mounted to a device 1002 by supports 1008. In one embodiment, the device 1002 is a low-noise electronic chip, but in other embodiments the device 1002 can be something different. The device 1002 is flip-chip mounted to a printed circuit board 1004 using several solder balls 1006.

The supports 1008 attach the vibration sensor array 100 to the device 1002. In one embodiment, the supports can create a sealed cavity 1010 between the vibration sensor array 100 and the device 1002, such that any air in the sealed cavity 1010 can be vacuumed out. The creation of a vacuum in the cavity 1010 substantially increases the value of Q in the equation discussed above in connection with FIG. 3, and thus significantly lowers the noise floors of the individual vibration sensors 104, 106 and 108 on the sensor array 100.

Figure 10:
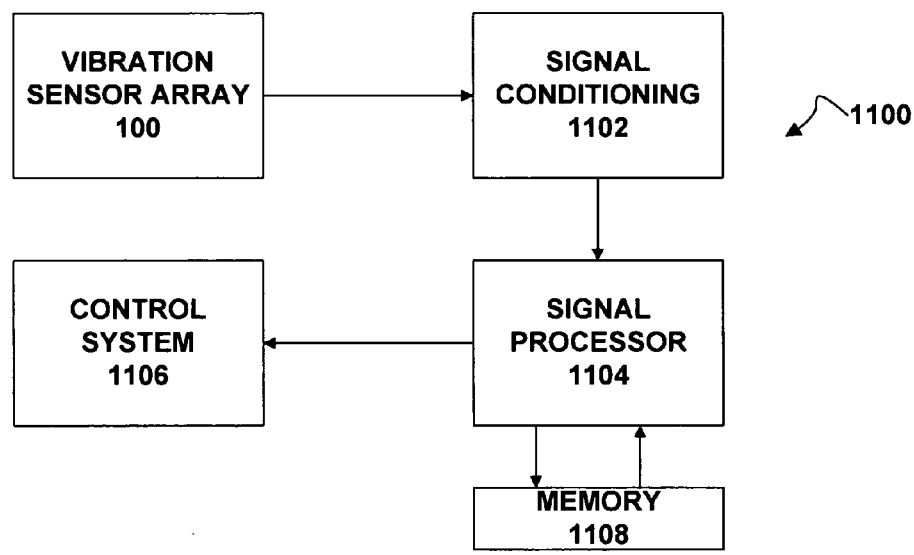
FIG. 10 is a block diagram of an embodiment of a system incorporating an embodiment of a vibration sensor array.

FIG. 10 illustrates an embodiment of a system 1100 including a sensor array such as sensor array 100. The system 1100 includes a sensor array 100 coupled to a signal conditioning unit 1102. In one embodiment, the signal conditioning unit can include elements such as amplifiers, analog-to-digital converters, and the like that condition the raw signals received from each of the vibration sensors 104, 106 and 108 within the vibration sensor array 100.

The signal conditioning unit 1102 is coupled to a signal processor 1104 which, in one embodiment, can be a digital signal processor. The signal processor 1104 is coupled to a memory 1108 with which it can exchange signal data while processing. In one embodiment, the memory 1108 can be a volatile memory such as static random access memory (SRAM) or dynamic random access memory (DRAM), but other types of volatile or non-volatile memory can be use in other embodiments.

The output of the signal processor is coupled to a control system 1106 that directs the motion of the device to which the vibration sensor 100 is attached. In one embodiment, the control system can be a cutoff mechanism that simply shuts down operation of the device to which the sensor array 100 is attached if the sensor array detects excessive vibration, vibration at an unexpected frequency, and so forth. In other embodiments, more sophisticated control systems can be used to alter the operation of the device to which the sensor array 100 is attached, providing closed-loop control of the device's intensity and frequency of vibration.

Figure 11:
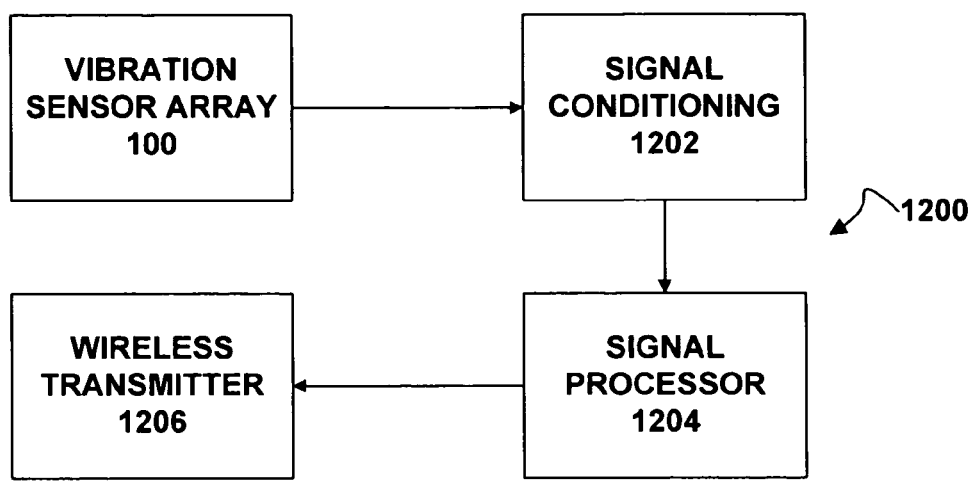
FIG. 11 is a block diagram of an alternative embodiment of a system incorporating an embodiment of a vibration sensor array.

FIG. 11 illustrates an alternative embodiment of a system 1200 including a sensor array such as sensor array 100. The system 1200 includes a sensor array 100 coupled to a signal conditioning unit 1202. In one embodiment, the signal conditioning unit can include elements such as amplifiers, analog-to-digital converters, and the like that condition the raw signals received from each of the vibration sensors 104, 106 and 108 within the vibration sensor array 100.

The signal conditioning unit 1202 is coupled to a signal processor 1204 which, in one embodiment, can be a digital signal processor. The signal processor 1104 is coupled to a wireless transmitter 1206, which can use the data from the signal processor in various ways. For example, in an embodiment where the vibration sensor array 100 is attached to a mobile telephone and the mobile telephone includes the wireless transmitter 1206, the vibration data can be used by the wireless transmitter 1206 to dial a telephone number.

The above description of illustrated embodiments of the invention, including what is described in the abstract, is not intended to be exhaustive or to limit the invention to the precise forms disclosed. While specific embodiments of, and examples for, the invention are described for illustrative purposes, various equivalent modifications are possible within the scope of the invention, as those skilled in the relevant art will recognize. These modifications can be made to the invention in light of the above detailed description.

The terms used in the following claims should not be construed to limit the invention to the specific embodiments disclosed in the specification and the claims. Rather, the scope of the invention is to be determined entirely by the following claims, which are to be construed in accordance with established doctrines of claim interpretation.

The invention claimed is:

1. An apparatus comprising:
   a substrate; and
   an array of two or more vibration sensors formed on the substrate, each vibration sensor comprising:
   a vibrating element, and
   a transducer formed on the vibrating element to convert the vibrations of
   the vibrating element into signals;
   wherein in at least one vibration sensor the corresponding vibrating element comprises a membrane coupled to the substrate by an anchor and the corresponding transducer comprises a pair of concentric transducer rings; and
   wherein each vibration sensor in the array has a different noise floor and a different operational frequency range than any of the other vibration sensors in the array.

2. The apparatus of claim 1 wherein the operational frequency ranges of the vibration sensors overlap.

3. The apparatus of claim 1 wherein each vibration sensor further includes a mass attached to the corresponding vibrating element.

4. The apparatus of claim 1 wherein at least one vibration sensor in the array is bulk-micromachined.

5. The apparatus of claim 1 wherein in at least one vibration sensor the corresponding vibrating element comprises a cantilever beam coupled to the substrate by an anchor and the corresponding transducer is formed on the cantilever beam near the corresponding anchor.

6. The apparatus of claim 1 wherein in at least one vibration sensor the corresponding vibrating element comprises a bridge beam coupled to the substrate by a pair of anchors and the corresponding transducer comprises two pairs of transducers, each pair positioned on a different side of the beam center.

7. The apparatus of claim 1 wherein in at least one vibration sensor the corresponding vibrating element comprises a plurality of suspension elements each of which is coupled to the substrate by an anchor and all of which are coupled to a center coupling and the corresponding transducer comprises a pair of transducers attached to each suspension element.

8. A process comprising:
forming an array of two or more vibration sensors on a substrate, each vibration sensor comprising:
a vibrating element, and
a transducer formed on the vibrating element to convert the vibrations of
the vibrating element into signals;
wherein in at least one vibration sensor the corresponding vibrating element comprises a membrane coupled to the substrate by an anchor and the corresponding transducer comprises a pair of concentric transducer rings; and
wherein each vibration sensor in the array has a different noise floor and a different operational frequency range than any of the other vibration sensors in the array.

9. The process of claim 8 wherein at least one vibration sensor in the array is bulk-micromachined.

10. The process of claim 8 wherein in at least one vibration sensor the corresponding vibrating element comprises a cantilever beam coupled to the substrate by an anchor and the corresponding transducer is formed on the cantilever beam near the corresponding anchor.

11. The process of claim 8 wherein in at least one vibration sensor the corresponding vibrating element comprises a bridge beam coupled to the substrate by a pair of anchors and the corresponding transducer comprises two pairs of transducers, each pair positioned on a different side of the beam center.

12. The process of claim 8 wherein in at least one vibration sensor the corresponding vibrating element comprises a plurality of suspension elements each of which is coupled to the substrate by an anchor and all of which are coupled to a center coupling and the corresponding transducer comprises a pair of transducers attached to each suspension element.

13. A system comprising:
an array of two or more vibration sensors formed on a substrate, each vibration sensor comprising a vibrating element and a transducer formed on the corresponding vibrating element to convert the vibrations of the corresponding vibrating element into signals, wherein each vibration sensor in the array has a different noise floor and a different operational frequency range than any of the other vibration sensors in the array and wherein in at least one vibration sensor the corresponding vibrating element comprises a membrane coupled to the substrate by an anchor and the corresponding transducer comprises a pair of concentric transducer rings;
a signal conditioning unit coupled to the outputs of the two or more vibration sensors;
a signal processing unit coupled to the output of the signal conditioning unit; and
a dynamic random access memory coupled to the signal processing unit.

14. The system of claim 13 wherein the signal processing unit is a digital signal processor and the signal conditioning unit includes an analog-to-digital converter.

15. The system of claim 13 wherein at least one vibration sensor in the array is bulk-micromachined.

16. The system of claim 13 wherein in at least one vibration sensor the corresponding vibrating element comprises a cantilever beam coupled to the substrate by an anchor and the corresponding transducer is formed on the cantilever beam near the corresponding anchor.

17. The system of claim 13 wherein in at least one vibration sensor the corresponding vibrating element comprises a bridge beam coupled to the substrate by a pair of anchors and the corresponding transducer comprises two pairs of transducers, each pair positioned on a different side of the beam center.

18. The system of claim 13 wherein in at least one vibration sensor the corresponding vibrating element comprises a plurality of suspension elements each of which is coupled to the substrate by an anchor and all of which are coupled to a center coupling and the transducer comprises a pair of transducers attached to each suspension element.

19. An apparatus comprising:
a substrate; and
an array of two or more vibration sensors formed on the substrate, each vibration sensor comprising:
a vibrating element, and
a transducer formed on the vibrating element to convert the vibrations of the vibrating element into signals;
wherein in at least one vibration sensor the corresponding vibrating element comprises a membrane coupled to the substrate by an anchor and the corresponding transducer comprises a pair of concentric transducer rings; and
wherein each vibration sensor in the array has a different noise floor and a different operational frequency range than any of the other vibration sensors in the array and wherein the substrate is packaged such that the array of vibration sensors is in a reduced-pressure environment.

20. The apparatus of claim 19 wherein the operational frequency ranges of the vibration sensors overlap.

21. The apparatus of claim 19 wherein each vibration sensor further includes a mass attached to the corresponding vibrating element.

22. The apparatus of claim 19 wherein at least one vibration sensor in the array is bulk-micromachined.

23. The apparatus of claim 19 wherein in at least one vibration sensor the corresponding vibrating element comprises a cantilever beam coupled to the substrate by an anchor and the corresponding transducer is formed on the cantilever beam near the corresponding anchor.

24. The apparatus of claim 19 wherein in at least one vibration sensor the corresponding vibrating element comprises a bridge beam coupled to the substrate by a pair of anchors and the corresponding transducer comprises two pairs of transducers, each pair positioned on a different side of the beam center.

25. The apparatus of claim 19 wherein in at least one vibration sensor the corresponding vibrating element comprises a plurality of suspension elements each of which is coupled to the substrate by an anchor and all of which are coupled to a center coupling and the corresponding transducer comprises a pair of transducers attached to each suspension element.

* * * * *